April 4, 1944.  J. E. MYER ET AL  2,345,856
TIMBER CONNECTOR
Filed May 5, 1942  2 Sheets-Sheet 1
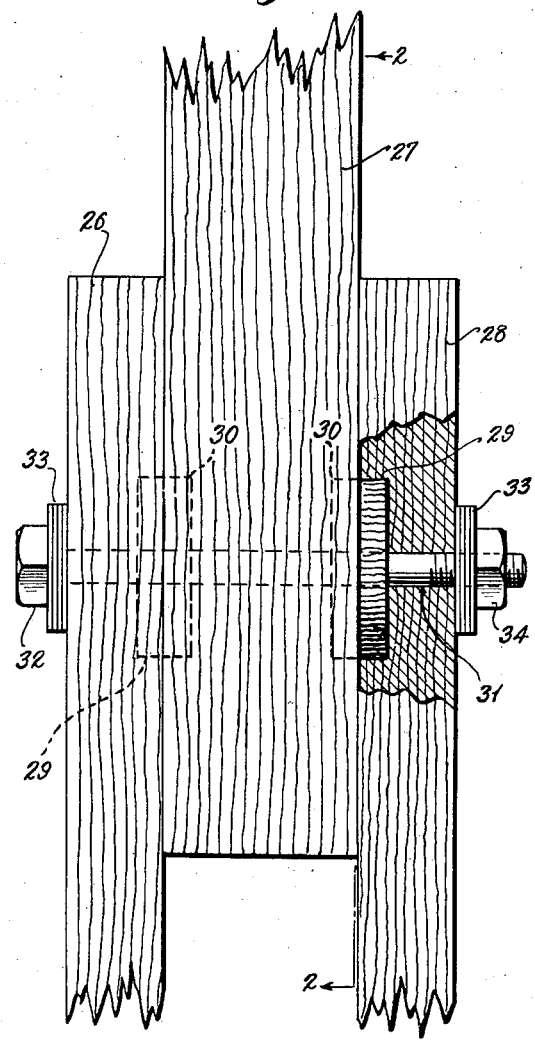
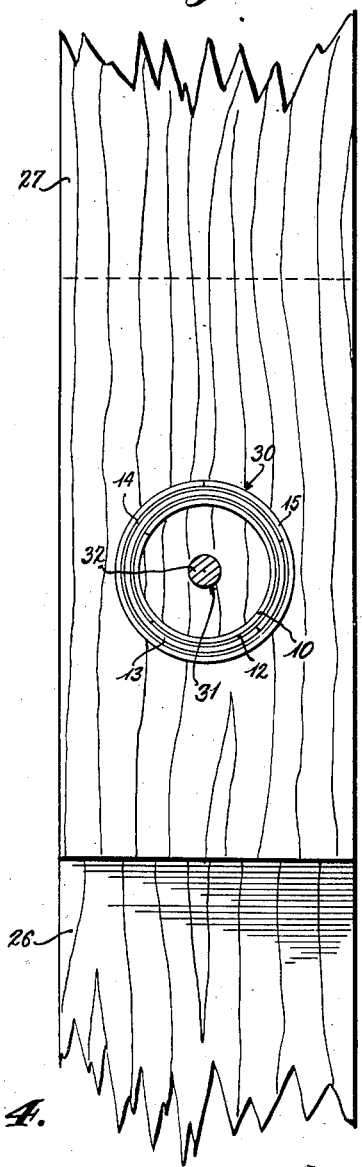
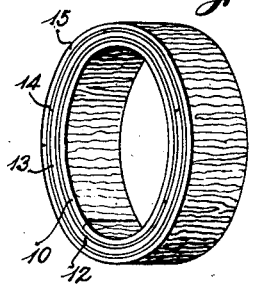
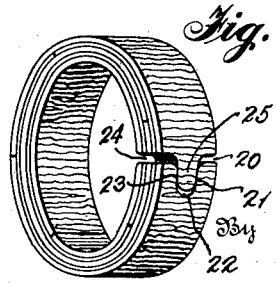
Inventors
James E. Myer and
Harry G. Uhl April 4, 1944.  J. E. MYER ET AL  2,345,856
TIMBER CONNECTOR
Filed May 5, 1942  2 Sheets-Sheet 2

Inventors
James E. Myer and
Harry G. Uhl
By Browne & Phelps
Attorneys

Patented Apr. 4, 1944

2,345,856

UNITED STATES PATENT OFFICE 2,345,856

TIMBER CONNECTOR

James E. Myer and Harry G. Uhl, Washington, D. C., assignors to Timber Engineering Company, Washington, D. C., a corporation of Delaware Application May 5, 1942, Serial No. 441,856

4 Claims. (Cl. 20—92)

This invention relates to timber connectors and more particularly to that type of said devices known as ring dowels.

Ring dowels are made in two forms, either as a closed ring or as a split ring and are adapted to be used in the connection of timbers in wooden building constructions wherein transmission of considerable tensile and compressive forces are present at each joint and which must be resisted by the device joining them. In assembly the ring dowels engage with coaxial borings of the timber members to be connected and serve to transmit the forces and distribute the stresses and the shearing action. In order to do this the ring dowels, in both the closed and split form are seated in coaxial circular grooves in the connected timbers so that a portion of the ring dowel is inserted in such groove in each one of the adjacent timbers to be connected.

The present invention has for its primary object the provision of such a dowel adapted to accomplish the desired result and formed of compressed, impregnated wood, known also as compregnated wood.

In the accompanying drawings forming a portion of this specification and wherein like reference numerals indicate the same parts throughout—

Figure 1 is a vertical elevation partly broken away showing an assembled joint.

Fig. 2 is a section on line 2—2 of Figure 1.

Fig. 3 is a perspective view of the closed type of ring dowel.

Fig. 4 is a perspective view of the split ring type of dowel.

Figure 5:
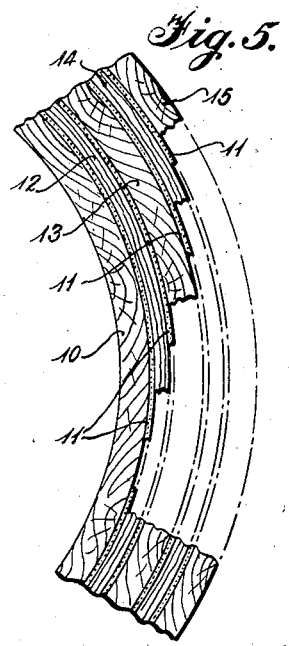
Fig. 5 is an enlarged view partially cut away to show the construction of the dowel.
Figure 6:
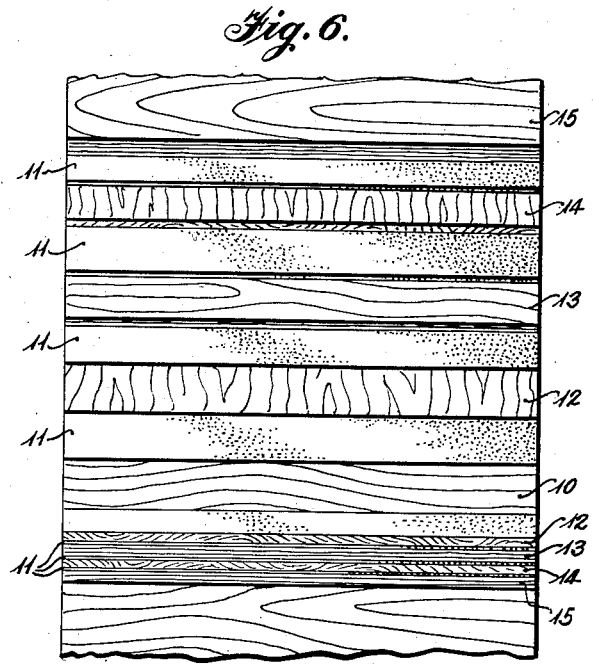
Fig. 6 is a view at right angles to Figure 5 showing the method of distributing the grain of the wood.

Compregnated plywood construction consists of laminations of impregnated and compressed wood which are alternately arranged one upon the other with intermediate layers of a thermoplastic binder usually of the phenolic condensation type with the grain of the wood laminations arranged at an angle to each other. We have found that ring dowels made from this material will resist compressive stresses and shearing action to an extent whereby they may be utilized as connectors in timber constructions when such dowels are made in accordance with our invention.

In order to form a ring dowel of the type shown in Figure 3 a laminate previously impregnated with an aqueous solution of a mixture of phenol and formaldehyde, indicated at 10 is placed upon a mandrel or other suitable cylindrical surface and coated with a binder comprising a suitable phenolic condensation product which is thermoplastic, said layer of binder being shown at 11. A second laminate 12 is arranged upon the binder. This laminate 12 is much thinner than the laminate 10 and the grain thereof is arranged at right angles to the grain of the laminate 10. A further layer of binder 11 is then spread upon the laminate 12 and a further laminate 13 placed thereon. This laminate 13 is of the same thickness as the original laminate 10 and is in turn covered by a layer of binder 11. Here again the grain of the wood of the laminate 13 is at right angles to the grain of the wood of the laminate 12 but extends in the same direction as the grain of the wood of laminate 10. A further layer of binder 11 is applied and another laminate 14 placed in position thereon. This laminate 14 is much thinner than that of the laminates 10 and 13 and is of the same thickness as the laminate 12 with the grain of the wood running in the same direction as that of laminate 12 but at right angles to the grain of the wood of laminates 10 and 13. A coating of binder 11 is again applied and a final laminate 15 superimposed thereon. This laminate 15 is of the same thickness as that of laminates 10 and 13, and has the grain of the wood extending in the same direction but at right angles to the grain of the wood in laminates 12 and 14.

While we have shown a structure comprising five laminations, such showing is for purposes of illustration only and the laminations may be increased or decreased as desired.

With the built up construction just described heat and pressure is now applied. Depending upon the wood used and the ultimate density desired the pressure may vary from 250 pounds per square inch to 1500 pounds per square inch with an accompanying temperature of approximately 300 degrees Fahrenheit. Heat and pressure is thus applied for a period of from fifteen to thirty minutes per depth inch of the original uncompressed structure. As an example, if a specific gravity of 1.3 in the finished article is desired in a wood such as spruce, 1000 pounds per square inch pressure will be necessary with a pressure and heating period of approximately twenty minutes to form the finished article.

Figure 7:
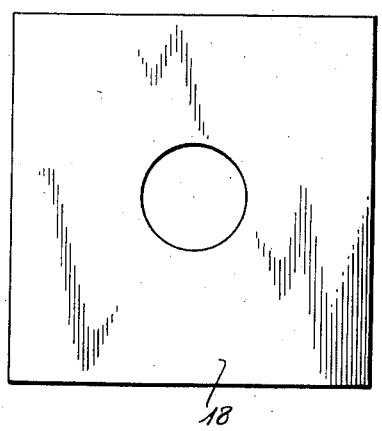
Fig. 7 is a plan view of a washer used in the assembly.
Figure 8:
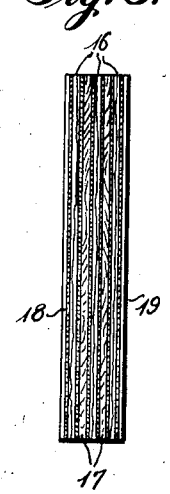
Fig. 8 is a section taken through Figure 7.
Figure 9:
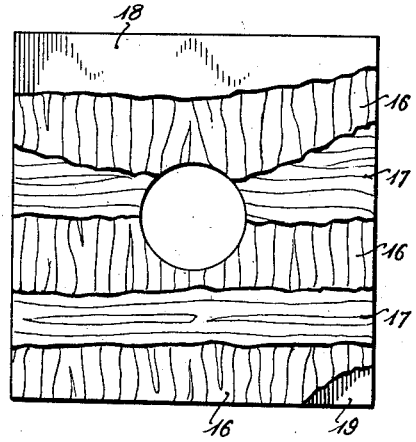
Fig. 9 is a sectional view of the washer showing the arrangement of the grain of the wood.

The washer shown in Figures 7 to 9 is prepared in the same way except that being flat the use of a mandrel is unnecessary. The various laminates 16—17 alternate in the direction of the grain and are of equal thickness while the layers of binder material are in between as above described. In order to present a surface for the washer of the desired qualities of tension and hardness, metal plates 18—19 are applied to the exterior surfaces before the whole is pressed to form a unitary article.

In finished form a ring dowel of the proposed type is as shown in Figure 3 while in order to make a ring dowel of the split ring type the form shown in Figure 3 is cut, by means of a suitable saw along the line 20 for a short distance horizontally and then cut along a line 21 longitudinally and again horizontally as at 22 with a rearward longitudinal cut 23 thereafter followed by a further horizontal cut 24. This gives a split ring in which the entire ring is free to move slightly about its horizontal axis but in which the two portions of the ring cannot be distorted out of line transversely because of the engagement of tongue 25 with the slot 23 formed in the cutting operation.

In use, and referring to Figures 1 and 2 specifically, Figure 1 shows three timbers 26, 27, and 28 wherein the timbers 26 and 28 are adapted to be joined to the timber 27 and either support the same or be supported thereby. To this end the inner faces of timbers 26 and 28 are grooved as at 29 to such a depth as to seat approximately one-half of the ring dowel therein, with the grooves being of such a width that the ring dowel may seat therein with a very small amount of lateral movement. The exterior faces of the timber 27 adjacent the point of juncture are also similarly grooved as at 30 in order that the other half of the ring dowel may be seated similarly therein as previously described. All three timbers 26, 27, and 28 are bored in the exact center of the circle formed by the grooves to form a hole designated as 31. The timbers are then placed in juxtaposition with the rings seated as shown in Figure 1 and a bolt 32 carrying washers of the type shown in Figures 7 to 9 and designated by the numeral 33 is threaded through and by means of a nut 32 tightened to a point where all of the timbers meet closely at their joining spaces and the rings are seated in the corresponding grooves 29 and 30.

With the laminated rings in this position the shearing force exerted by means of a load applied to the timbers thus joined together is distributed about the wooden core formed in each timber inside of the grooves 29 and 30 and thus encircled by the ring dowel. It will be seen that in forming this ring dowel the thicker laminates have been arranged so that the grain thereof extends in such a way as to resist and distribute the shearing force whereas the thinner laminates are used merely to build the finished structure. Laminated rings thus formed and installed have resisted shearing stresses of more than 16,000 pounds and therefore compare favorably with the action of metal rings used in the same way.

What we claim is:

1. A ring dowel comprising a series of relatively thick laminations of wood separated by thinner laminations of wood and a binder of phenolic condensation adhesive between said laminations.

2. A ring dowel comprising wood laminations in which the grain of the wood in certain of said laminations is parallel to the axis of said ring to resist shear stress when said dowel is in use, certain other of said laminations being arranged with their grain at an angle to the grain of the said first named laminations and a binder of phenolic condensation adhesive holding all of said laminations in a unitary construction.

3. A ring dowel comprising a split plurality of laminations of wood and a binder of thermoplastic adhesive between said laminations.

4. A ring dowel comprising a thick base lamination of wood with the grain of such wood disposed transversely to resist shearing stress when the dowel is in use in a structure, a superimposed relatively thinner lamination having its grain at right angles to the grain of said base lamination and a plurality of superimposed laminations alternately arranged in the same relative order of thickness and grain, a layer of phenolic condensation binder between each of said adjacent laminations whereby upon the application of heat and pressure a unitary structure is formed.

JAMES E. MYER.
HARRY G. UHL.